United States Patent
Fu (10) Patent No.: US 11,335,345 B2
(45) Date of Patent: May 17, 2022

(54) METHOD FOR VOICE CONTROL, TERMINAL, AND NON-TRANSITORY COMPUTER-READABLE STORAGE MEDIUM

(71) Applicant: BEIJING XIAOMI MOBILE SOFTWARE CO., LTD., Beijing (CN)

(72) Inventor: Wenjun Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 204 days.

(21) Appl. No.: 16/696,519

(22) Filed: Nov. 26, 2019

(65) Prior Publication Data

US 2021/0074293 A1    Mar. 11, 2021

(30) Foreign Application Priority Data

Sep. 11, 2019 (CN) .......................... 201910860214.9

(51) Int. Cl.
| | | |
|---|---|---|
| G10L 15/25 | (2013.01) | |
| G10L 15/08 | (2006.01) | |
| G10L 15/22 | (2006.01) | |
| G06V 40/20 | (2022.01) | |
| G06V 40/16 | (2022.01) | |

(52) U.S. Cl.
CPC ............ *G10L 15/25* (2013.01); *G06V 40/161* (2022.01); *G06V 40/174* (2022.01); *G06V 40/20* (2022.01); *G10L 15/08* (2013.01); *G10L 15/22* (2013.01); *G10L 2015/088* (2013.01); *G10L 2015/223* (2013.01)

(58) Field of Classification Search
CPC ... G10L 15/08; G10L 2015/088; G10L 15/25; G06K 9/00228; G06K 9/00302; G06K 9/00335
See application file for complete search history.

(56) References Cited

U.S. PATENT DOCUMENTS

| | | | | |
|---|---|---|---|---|
| 9,092,394 | B2* | 7/2015 | Dokor | G10L 15/24 |
| 10,860,096 | B2* | 12/2020 | Kelly | G06F 3/013 |
| 2011/0317874 | A1* | 12/2011 | Ikenoue | G06K 9/00315 |
| | | | | 382/103 |
| 2020/0108720 | A1* | 4/2020 | Sekiguchi | H04R 1/08 |
| 2021/0058549 | A1* | 2/2021 | Ji | H04N 5/23245 |

FOREIGN PATENT DOCUMENTS

| | | |
|---|---|---|
| CN | 108052079 A | 5/2018 |
| CN | 108733420 A | 11/2018 |
| CN | 108766438 A | 11/2018 |
| CN | 109032039 A | 12/2018 |
| CN | 109508687 A | 3/2019 |

OTHER PUBLICATIONS

First Office Action of the Chinese application No. 201910860214.9, dated Mar. 23, 2021.
Supplementary European Search Report in the European application No. 19212602.7, dated Jun. 9, 2020.

* cited by examiner

*Primary Examiner* — Abul K Azad
(74) *Attorney, Agent, or Firm* — Syncoda LLC; Feng Ma (57) ABSTRACT

A method for voice control includes: a voice is acquired to obtain a voice signal; image information is obtained; whether a pose attribute of a target object that utters the voice satisfies a preset condition is determined based on the image information; and responsive to that the pose attribute of the target object satisfies the preset condition, an operation indicated by the voice signal is performed.

14 Claims, 7 Drawing Sheets

METHOD FOR VOICE CONTROL, TERMINAL, AND NON-TRANSITORY COMPUTER-READABLE STORAGE MEDIUM

CROSS-REFERENCE TO RELATED APPLICATION

This application claims priority to Chinese patent application No. 201910860214.9 filed on Sep. 11, 2019, the disclosure of which is hereby incorporated by reference in its entirety.

BACKGROUND

With the development of smart home devices and the improvement of living conditions, use of smart home devices becomes more and more frequent. At present, voice control is a popular man-machine interaction method for controlling a smart home device, and becomes a develop trend in the future.

SUMMARY

The present disclosure relates to the field of smart homes, and more specifically to a method for voice control, a terminal and a non-transitory computer-readable storage medium.

According to a first aspect of embodiments of the present disclosure, a method for voice control is provided, which includes:

a voice is acquired to obtain a voice signal;

image information is obtained;

whether a pose attribute of a target object that utters the voice satisfies a preset condition is determined based on the image information; and responsive to that the pose attribute of the target object satisfies the preset condition, an operation indicated by the voice signal is performed.

According to a second aspect of the embodiments of the present disclosure, a terminal is provided, which may include:

a processor; and a memory configured to store instructions executable for the processor, the processor may be configured to:

acquire a voice to obtain a voice signal;

obtain image information;

determine, based on the image information, whether a pose attribute of a target object that utters the voice satisfies a preset condition; and responsive to that the pose attribute of the target object satisfies the preset condition, perform an operation indicated by the voice signal.

According to a third aspect of the embodiments of the present disclosure, a non-transitory computer-readable storage medium is provided, instructions stored in the storage medium may be executed by a processor of a terminal to enable the terminal to execute a method for voice control, the method including:

acquiring a voice to obtain a voice signal;

obtaining image information;

determining, based on the image information, whether a pose attribute of a target object that utters the voice satisfies a preset condition; and responsive to that the pose attribute of the target object satisfies the preset condition, performing an operation indicated by the voice signal.

It is to be understood that the above general descriptions and the following detailed descriptions are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

In some examples, a user controls, through a voice instruction, an intelligent speaker to access a network, choose a song or know about a weather forecast, or controls another smart home device, for example, opening a curtain, setting a temperature of a refrigerator and turning on a water heater in advance.

However, there exists the problem of low voice control interaction efficiency.

Figure 1:
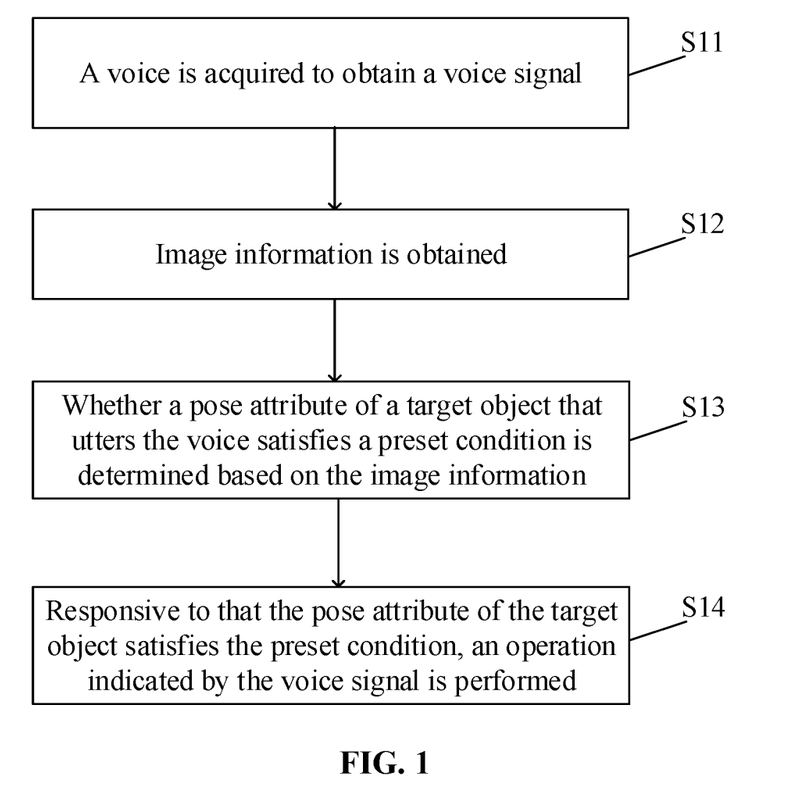
FIG. 1 illustrates a first flowchart of a method for voice control according to some embodiments of the present disclosure.

FIG. 1 illustrates a first flowchart of a method for voice control according to some embodiments of the present disclosure. As illustrated in FIG. 1, the voice control method is applied to a voice device and includes the following operations.

At block S11, a voice is acquired to obtain a voice signal.

At block S12, image information is obtained.

At block S13, whether a pose attribute of a target object that utters the voice satisfies a preset condition is determined based on the image information.

At block S14, responsive to that the pose attribute of the target object satisfies the preset condition, an operation indicated by the voice signal is performed.

In the embodiments of the present disclosure, the voice device, after receiving the voice signal, determines based on the obtained image, the pose attribute of the target object that utters the voice and, when the pose attribute of the target object satisfies the preset condition, performs the operation indicated by the voice signal. In such a manner, the voice device is not required to be waked up through a wakeup word at first but directly determines the pose attribute of the target object based on the obtained image information and, when the pose attribute satisfies the preset condition, performs the operation indicated by the voice signal, so that voice interaction efficiency and a user experience may be improved.

In the embodiment of the present disclosure, the voice device includes a mobile device and fixed device supporting voice service. The voice device includes a smart home device such as a mobile phone, a tablet computer, a personal computer (PC), an intelligent speaker, an intelligent television, an intelligent refrigerator, an intelligent air conditioner and an intelligent air purifier.

It is to be noted that, in the embodiment of the present disclosure, the voice device may obtain the image information. One manner is that the voice device includes an image acquisition component such that the voice device may acquire an image through the image acquisition component thereof to obtain the image information. The other manner is that the voice device is connected with an external image acquisition component to obtain the image information.

For example, the voice device is an intelligent speaker, and the intelligent speaker is connected with an external camera, so that the intelligent speaker may acquire an image through the connected external camera to obtain the image information.

In some embodiments, the voice device serving as an execution body may be in a non-wakeup state and, when the pose attribute of the target object satisfies the preset condition at block S14, is waked up and performs the operation indicated by the voice signal.

At blocks S13 and S14, after obtaining the image information, the voice device determines, based on the image information, whether the pose attribute of the target object that utters the voice satisfies the preset condition and, under the circumstance that the pose attribute satisfies the preset condition, performs the operation indicated by the voice signal.

The pose attribute includes at least one of: a facial expression, a face orientation, an eye focus state, or a gesture.

In the embodiment of the present disclosure, the operation of performing the operation indicated by the voice signal may include that: voice content is acquired by the voice device from the voice signal, and the operation indicated by the voice signal is performed by the voice device based on voice content in the voice signal. For example, when voice content obtained by an intelligent refrigerator according to a voice signal is "turn on the air conditioner", the intelligent speaker may send a control instruction corresponding to the voice content to the air conditioner; and when the obtained voice content is "play songs", the intelligent speaker may perform a song playing operation.

It is to be noted that a manner in which the voice device acquires the voice content includes that the voice device obtains the voice content using its own voice recognition function. In addition, when the voice device determines, based on the voice content, to control another device, for example the "air conditioner" to execute the operation, the other device that is controlled is an execution device mentioned in the present disclosure.

In some embodiments, descriptions are made with the condition that the pose attribute includes the face orientation of the target object as an example. Correspondingly, the preset condition includes a preset orientation condition. The operation illustrated in block S13 includes: whether the face orientation of the target object satisfies the preset orientation condition is determined based on the image information.

A manner in which the voice device determines the face orientation of the target object based on the image information includes that the voice device transmits the image information to a server and receives the face orientation, returned by the server, of the target object in the image information, and also includes that the voice device analyzes the acquired image information to determine the face orientation of the target object.

In the embodiment of the present disclosure, the operation that the voice device analyzes the image information to determine the face orientation of the target object includes: the voice device detects a target face from the image information and recognizes a face orientation of the target face based on a face pose model. Here, the face pose model includes face images with different face orientations.

Of course, the face orientation of the target face may also be determined based on the structural characteristics of the five organs of the face after the target face is detected from the image information. In some embodiments of the present disclosure, the operation of determining the face orientation of the target face based on the structural characteristics of the five organs of the face includes: the voice device determines, based on the target face, a first distance between a first human eye and a nose tip and a second distance between a second human eye and the nose tip in the target face and determines the face orientation of the target face based on the first distance and the second distance.

In the embodiment of the present disclosure, if a camera, including a front camera and a rear camera, is arranged in the voice device, the face orientation determined by the voice device based on the image information acquired by the built-in camera is the face orientation of the target object relative to the voice device.

In some embodiments of the present disclosure, when the preset orientation condition is that the face orientation of the target object is forward, namely the five organs of the face forward toward the voice device, the voice device determines according to the face pose model that the face orientation of the target face is 0 degree, and it is indicated that the face orientation of the target object satisfies the preset orientation condition. In a case that the face orientation is determined according to the structural characteristics of the five organs in the image information, when a difference between the first distance and the second distance is no greater than a defined threshold, for example, the difference between the first distance and the second distance is equal to or less than the defined threshold, it is indicated that the face orientation satisfies the preset orientation condition.

In the embodiment of the present disclosure, when the voice device is connected with an external camera to acquire the image information, the voice device may prompt a user to input a direction of the camera relative to the voice device based on an interface display or a voice reminder. The voice device, after obtaining a face orientation of the target object relative to the camera based on the acquired image information, may calculate a face orientation of the target object relative to the voice device according to the face orientation of the target object relative to the camera and the direction of the camera relative to the voice device.

In some embodiments of the present disclosure, the intelligent speaker is connected with the external camera to obtain the image information. When the camera is arranged over the intelligent speaker, the intelligent speaker obtains, based on an input of the user, that the direction of the camera relative to the voice device is 0 degree. When the preset orientation condition is that the face orientation of the target object is forward, under the circumstance that the direction of the camera relative to the voice device is 0 degree, if the face orientation of the target object in the obtained image information is 0 degree, it is indicated that the face of the target object faces toward the intelligent speaker and the preset orientation condition is satisfied.

In some embodiments, both a built-in image acquisition device and an external image acquisition device may acquire the image characterizing that the face of the user faces toward the voice device or the execution device for the operation indicated by the voice signal is forward in advance. In a subsequent image acquisition process, an acquired image is compared with the preset image characterizing the forward direction, and when a similarity between the acquired image and the preset image characterizing the forward direction is less than a preset threshold, it may be determined that the present face orientation of the user is forward.

For the circumstance that a judgment condition is that the face of the user faces toward the voice device, if the image acquisition device is external and forms a certain angle with the voice device, the face of the user, when facing forward toward the voice device, may not be forward relative to the external image acquisition device, and a non-forward image for characterizing the face of the user is not forward toward to the external image acquisition device is determined as a forward reference image that the face of the user faces forward toward the voice device.

For the circumstance that the judgment condition is that the face of the user faces toward the execution device that performs the operation indicated by the voice signal, a certain angle may be formed between positions of the execution device and the voice device. In such case, no matter whether the image acquisition device of the voice device is built-in or external, for the image acquisition device, a acquired image where the face of the user is forward toward to the execution device may not be forward relative to the image acquisition device, and then the non-forward image relative to the image acquisition device is determined as a forward reference image where the face of the user faces toward the execution device.

The similar manner is adopted for the other poses such as the facial expression, the eye focus state and the gesture and elaborations are omitted herein.

In addition, in the embodiment of the present disclosure, before the face orientation of the target object is obtained, for ensuring that the acquired voice signal and image information are from the same target object, the voice device may further extract a voiceprint feature from the voice signal to determine a first identity of a first object that the voice signal belongs to and detect a face image from the image information to determine a second identity of a second object that the image information belongs to and, when the voice device confirms that the first identity is matched with the second identity, determines that the voice signal and the image information are from the same target object.

Of course, in the embodiment of the present disclosure, the voice device may also send the acquired voice signal and image information to the server, and the server executes the abovementioned processing process and feeds back a processing result to the voice device for the voice device to determine whether to acquire the face orientation of the target object or not.

It may be understood that, in the embodiment, the face orientation of the target object is determined after it is ensured that the acquired voice signal and image information are from the same target object, and when the face orientation satisfies the preset orientation condition, the voice device is controlled to perform the operation indicated by the voice signal, so that voice control accuracy may be improved.

In some embodiments, the pose attribute further includes a duration of the face orientation of the target object, and the preset condition further includes a preset duration condition.

The operation illustrated in block S13 further includes: based on the image information, whether the face orientation of the target object satisfies the preset orientation condition is determined and whether the duration during which the face orientation of the target object satisfies the preset orientation condition satisfies the preset duration condition is determined.

In the embodiment, when the user unintentionally speaks the voice signal capable of driving the voice device to execute the operation, the voice device captures the image information, consistent with the preset orientation condition, of the user but the user is not intended to control the voice device, the voice device may execute an unnecessary operation. Therefore, for improving control accuracy, the voice device may not only determine that the face orientation satisfies the preset orientation condition but also monitor the duration of the face orientation of the target object.

The preset duration condition may be set by the user according to an own hobby and may also be a default configuration, for example, 1 second or 2 seconds. There are no limits made in the embodiment of the present disclosure.

In some embodiments, the operation that the voice device determines whether the duration during which the face orientation of the target object satisfies the preset orientation condition satisfies the preset duration condition includes:

whether the duration during which the face orientation of the target object satisfies the preset orientation condition satisfies a threshold is determined, or, whether a difference between the duration during which the face orientation of the target object satisfies the preset orientation condition and a duration during which the voice signal is acquired is less than a threshold is determined.

In the embodiment, a preset duration may include a preset duration of the face orientation of the target object. For ensuring synchronization of voice acquisition and image acquisition to improve the voice control accuracy, the preset duration may further include a difference between the preset duration of the face orientation and the duration of the acquired voice signal.

In some embodiments, the operation that the voice device determines whether the face orientation satisfies the preset orientation condition includes:

responsive to that a face of the target object faces toward a voice device that acquires the voice signal, it is determined that the face orientation satisfies the preset orientation condition, or, responsive to that the face of the target object faces toward an execution device that performs the operation indicated by the voice signal, determine that the face orientation satisfies the preset orientation condition.

In the embodiment, the preset orientation condition refers to a relative position condition of the face of the target object and the voice device for acquiring the voice signal or the execution device for performing the operation indicated by the voice signal.

In some embodiments of the present disclosure, the voice device acquiring the voice signal is a mobile phone, and the voice signal instructs the intelligent speaker to execute the operation. Then, in the image information acquired by the voice device, that the face of the target object that utters the voice faces toward the mobile phone or the intelligent speaker is a circumstance that the face orientation satisfies the preset orientation condition.

A judgment manner for determining whether the face faces toward the voice device or not includes a manner that the voice device detects the target face from the image information and judges the face orientation of the target face based on the face pose model. A judgment manner for determining whether the face faces the execution device or not includes that the voice device determines a relative direction relationship between the execution device and the voice device based on a communication connection between the voice device and the execution device at first and then determines a relative direction relationship between the target face and the execution device according to the relative direction relationship between the execution device and the voice device and the face orientation of the target face in the image information, i.e., a relative direction relationship between the target face and the voice device.

A manner in which the voice device determines the relative direction relationship between the voice device and the execution device includes that the voice device obtains, based on the communication connection between the voice device and the execution device, the relative direction relationship between the voice device and the execution device through global positioning system (GPS) data.

In some embodiments, after the voice device obtains, based on the image information, the pose attribute of the target object that utters the voice, the operation illustrated in block S14 includes:

responsive to that the pose attribute of the target object satisfies the preset condition, the voice device is controlled to enter into a wakeup state from a dormant state; and a voice service of the voice device in the wakeup state is adopted to execute or instruct the corresponding execution device to execute the operation indicated by the voice signal.

It is to be noted that, In some embodiments of the present disclosure, the voice device, when being in the dormant state, may acquire the voice signal but may not recognize the voice signal and execute the operation indicated by the voice signal, and may recognize the voice signal and execute or instruct the corresponding execution device to execute the operation indicated by the voice signal only when being in the wakeup state.

It may be understood that, in the embodiment of the present disclosure, the voice device is not required to wake up the voice service through a wakeup word at first but directly wakes up the voice service according to the pose attribute of the target object in the acquired image information, and the voice device adopts the voice service in the wakeup state to execute the operation indicated by the voice signal, so that voice interaction efficiency and a user experience are improved.

Figure 2:
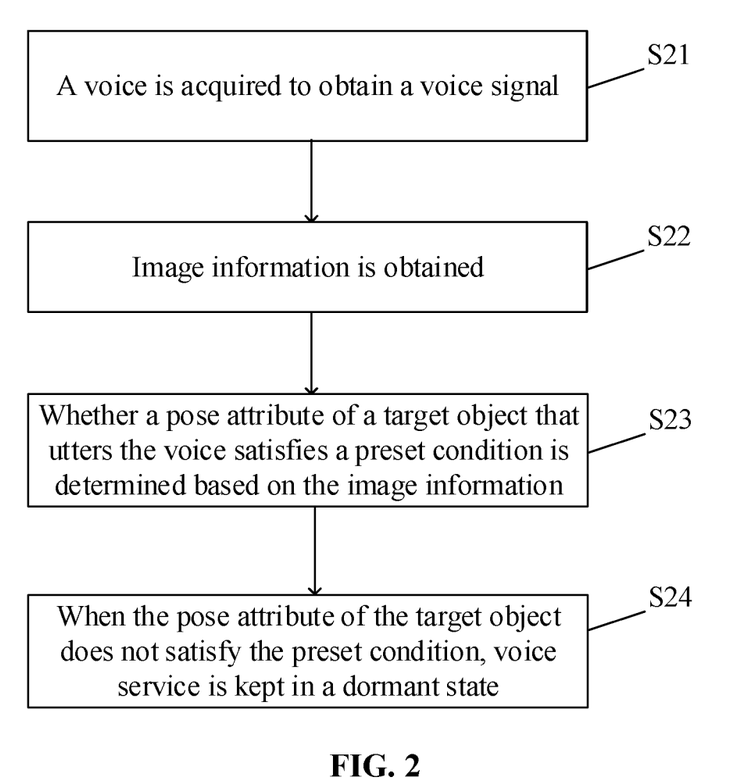
FIG. 2 illustrates a second flowchart of a method for voice control according to some embodiments of the present disclosure.

FIG. 2 illustrates a second flowchart of a method for voice control according to some embodiments of the present disclosure. The voice control method includes the following operations.

At block S21, a voice is acquired to obtain a voice signal.

At block S22, image information is obtained.

At block S23, whether a pose attribute of a target object that utters the voice satisfies a preset condition is determined based on the image information.

At block S24, responsive to that the pose attribute of the target object does not satisfy the preset condition, voice service is kept in a dormant state.

In the embodiment, when the pose attribute of the target object does not satisfy the preset condition, a voice device is kept in the dormant state, so that electric power consumption of the voice device is reduced.

Figure 3:
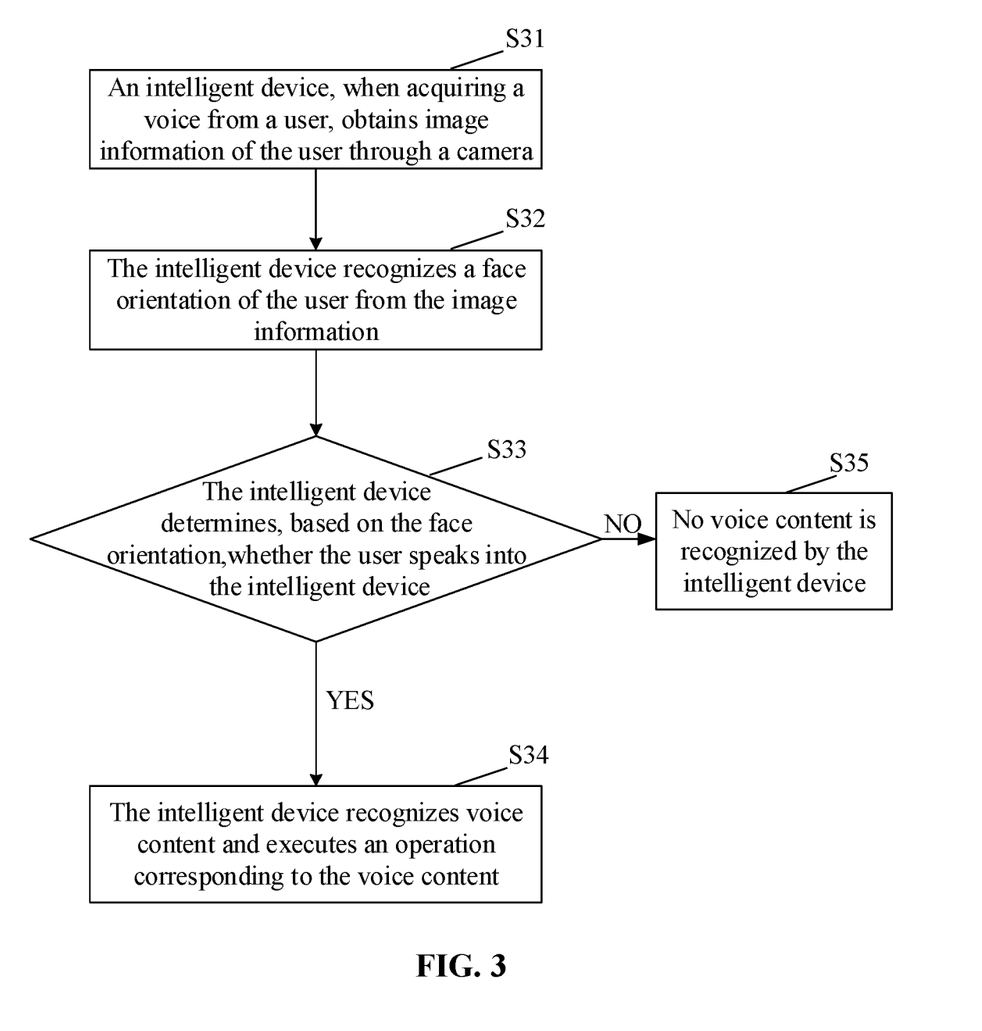
FIG. 3 illustrates a third flowchart of a method for voice control according to some embodiments of the present disclosure.

FIG. 3 illustrates a third flowchart of a method for voice control according to some embodiments of the present disclosure. As illustrated in FIG. 3, the voice control method includes the following operations.

At block S31, an intelligent device, when acquiring a voice from a user, obtains image information of the user through a camera.

In the embodiment, the intelligent device is a voice device, and the user is a target object.

At block S32, the intelligent device recognizes a face orientation of the user from the image information.

In the embodiment, the face orientation of the user is a pose attribute of the target object that utters the voice.

At block S33, the intelligent device determines based on the face orientation, whether the user speaks into the intelligent device, if YES, performs an operation illustrated in S35 and, if NO, performs an operation illustrated in S34.

In the embodiment, whether the user speaks into the intelligent device or not refers to whether the pose attribute of the user when the user utters the voice satisfies the preset condition or not.

At block S34, the intelligent device recognizes voice content and executes an operation corresponding to the voice content, and the flow is ended.

In the embodiment, when the user speaks into the intelligent device, the intelligent device enters into a wakeup state from a dormant state and thus may recognize the voice content and execute the corresponding operation when being in the wakeup state.

At block S35, no voice content is recognized by the intelligent device, and the flow is ended.

In the embodiment, when the user does not speak into the intelligent device, the intelligent device does not recognize the voice content because voice service of the intelligent device is in the dormant state. The intelligent device in the dormant state does not recognize the voice content, and thus does not execute the operation corresponding to the voice content.

Descriptions will be made below with the condition that the voice device is an intelligent speaker and the execution device is an air conditioner as an example. The intelligent speaker supports a voice service function and an image acquisition function and may acquire timely the image information of the user when the user utters the voice.

Figure 4:
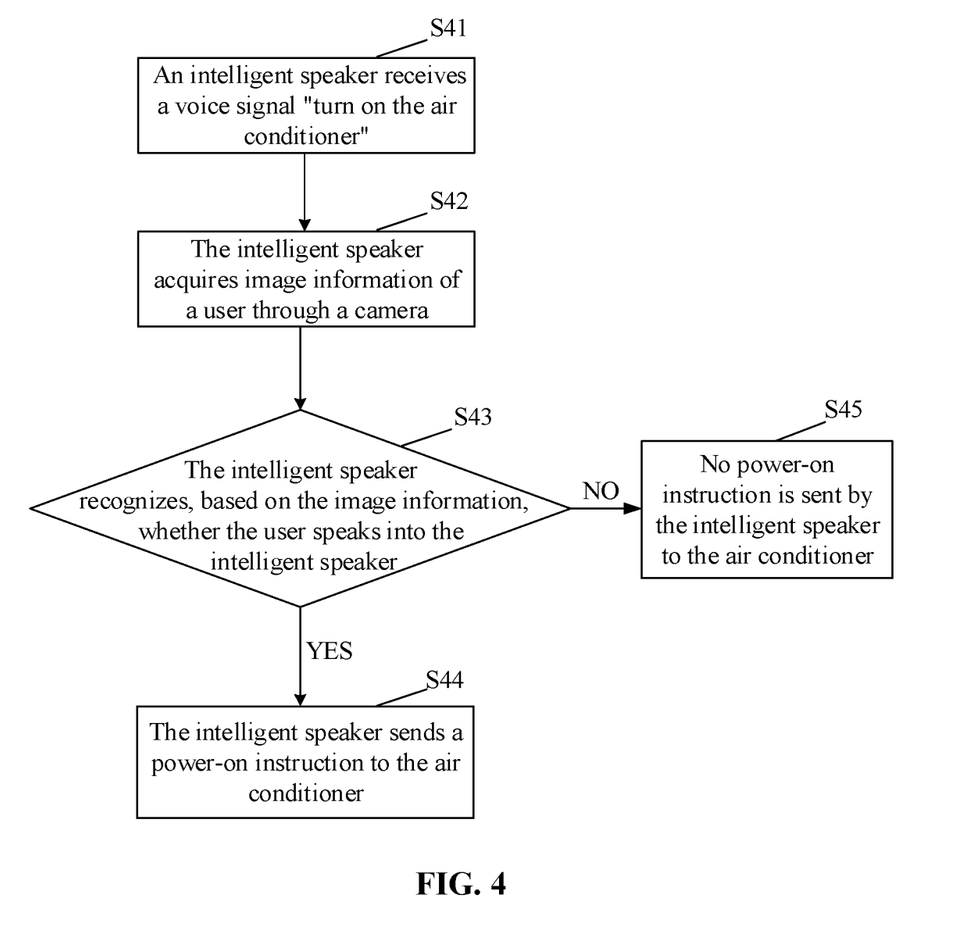
FIG. 4 illustrates a flowchart of a method for voice control according to some embodiments of the present disclosure.

FIG. 4 illustrates a flowchart of a method for voice control according to some embodiments of the present disclosure. As illustrated in FIG. 4, the voice control method includes the following operations.

At block S41, the intelligent speaker receives a voice signal "turn on the air conditioner".

At block S42, the intelligent speaker acquires image information of a user through a camera.

At block S43, the intelligent speaker recognizes based on the image information, whether the user speaks into the intelligent speaker or not, if YES, executes an operation illustrated in S44 and, if NO, executes an operation illustrated in S45.

In the embodiment, the operation that the intelligent speaker recognizes whether the user speaks into the intelligent speaker or not is the operation that the voice device determines whether the pose attribute of the target object that utters the voice satisfies the preset condition or not.

At block S44, the intelligent speaker sends a power-on instruction to the air conditioner, and the flow is ended.

In the embodiment of the present disclosure, the operation that the intelligent speaker sends the power-on instruction to the air conditioner is that the voice service of the voice device is in the wakeup state and the voice device may execute the operation indicated by the voice signal.

At block S45, no power-on instruction is sent by the intelligent speaker to the air conditioner, and the flow is ended.

In the embodiment of the present disclosure, the operation that the intelligent speaker does not send the power-on instruction to the air conditioner is that the voice device does not execute the operation indicated by the voice signal.

In the embodiment of the present disclosure, the intelligent speaker, after receiving the voice signal "turn on the air conditioner", may determine based on the acquired image information whether the user speaks into the intelligent speaker or not, and under the circumstance that the user speaks into the intelligent speaker, the intelligent speaker controls the air conditioner to be turned on. In such a manner, the intelligent speaker is not required to wake up the voice service through a wakeup word but directly, based on the image information acquired when the user utters the voice, recognizes the face orientation from the image information to wake up the voice service, so that voice interaction efficiency and a user experience are improved.

Figure 5:
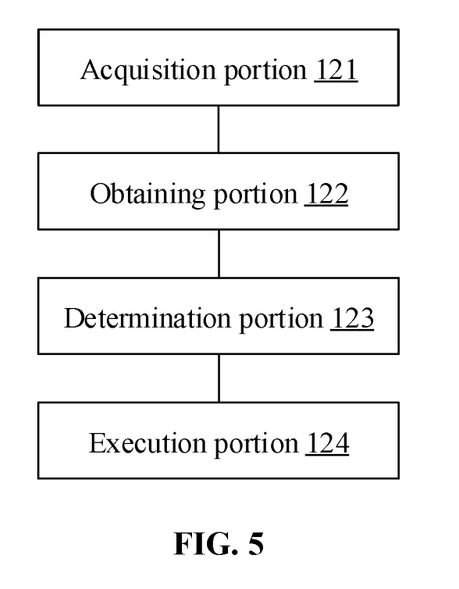
FIG. 5 illustrates a first diagram of a device for voice control according to some embodiments of the present disclosure.

FIG. 5 illustrates a first diagram of a device for voice control according to some embodiments. Referring to FIG. 5, the voice control device includes an acquisition portion 121, an obtaining portion 122, a determination portion 123 and an execution portion 124.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

The acquisition portion 121 is configured to acquire a voice to obtain a voice signal.

The obtaining portion 122 is configured to obtain image information.

The determination portion 123 is configured to determine, based on the image information, whether a pose attribute of a target object that utters the voice satisfies a preset condition.

The execution portion 124 is configured to, responsive to that the pose attribute of the target object satisfies the preset condition, perform an operation indicated by the voice signal.

In some embodiments, the determination portion 123 is configured to determine based on the image information whether a face orientation of the target object satisfies a preset orientation condition or not, or, based on the image information, determine whether the face orientation of the target object satisfies the preset orientation condition or not and determine whether a duration during which the face orientation of the target object satisfies the preset orientation condition satisfies a preset duration condition or not.

In some embodiments, the determination portion 123 is configured to determine whether the duration during which the face orientation of the target object satisfies the preset orientation condition reaches a threshold, or, determine whether a difference between the duration during which the face orientation of the target object satisfies the preset orientation condition and a duration during which the voice signal is acquired is less than a threshold.

In some embodiments, the determination portion 123 is configured to, responsive to that a face of the target object faces toward a voice device acquiring the voice signal, determine that the face orientation satisfies the preset orientation condition, or, responsive to that the face of the target object faces an execution device for performing the operation indicated by the voice signal, determine that the face orientation satisfies the preset orientation condition.

In some embodiments, the execution portion 124 is configured to, responsive to that the pose attribute of the target object satisfies the preset condition, control the voice device to enter into a wakeup state from a dormant state and adopt a voice service of the voice device in the wakeup state to perform or instruct the corresponding execution device to execute the operation indicated by the voice signal.

Figure 6:
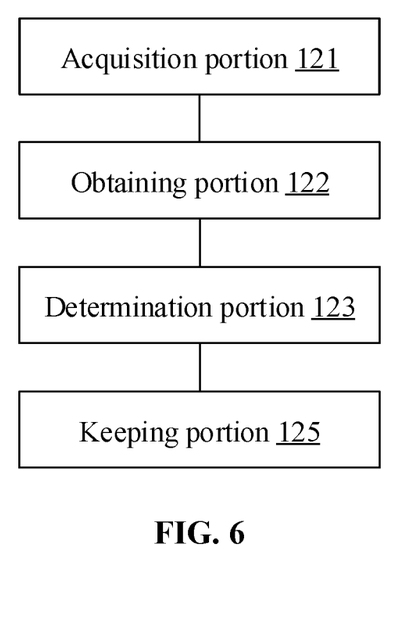
FIG. 6 illustrates a second diagram of a device for voice control according to some embodiments of the present disclosure.

FIG. 6 illustrates a second diagram of a device for voice control according to some embodiments. Referring to FIG. 6, the voice control device includes an acquisition portion 121, an obtaining portion 122, a determination portion 123 and a keeping portion 125.

The acquisition portion 121 is configured to acquire a voice to obtain a voice signal.

The obtaining portion 122 is configured to obtain image information.

The determination portion 123 is configured to determine based on the image information whether a pose attribute of a target object that utters the voice satisfies a preset condition.

The keeping portion 125 is configured to, when the pose attribute of the target object does not satisfy the preset condition, keep voice service in a dormant state.

With respect to the device in the above embodiment, the exemplary manners for performing operations for individual portions therein have been described in detail in the embodiment regarding the method, which will not be elaborated herein.

Figure 7:
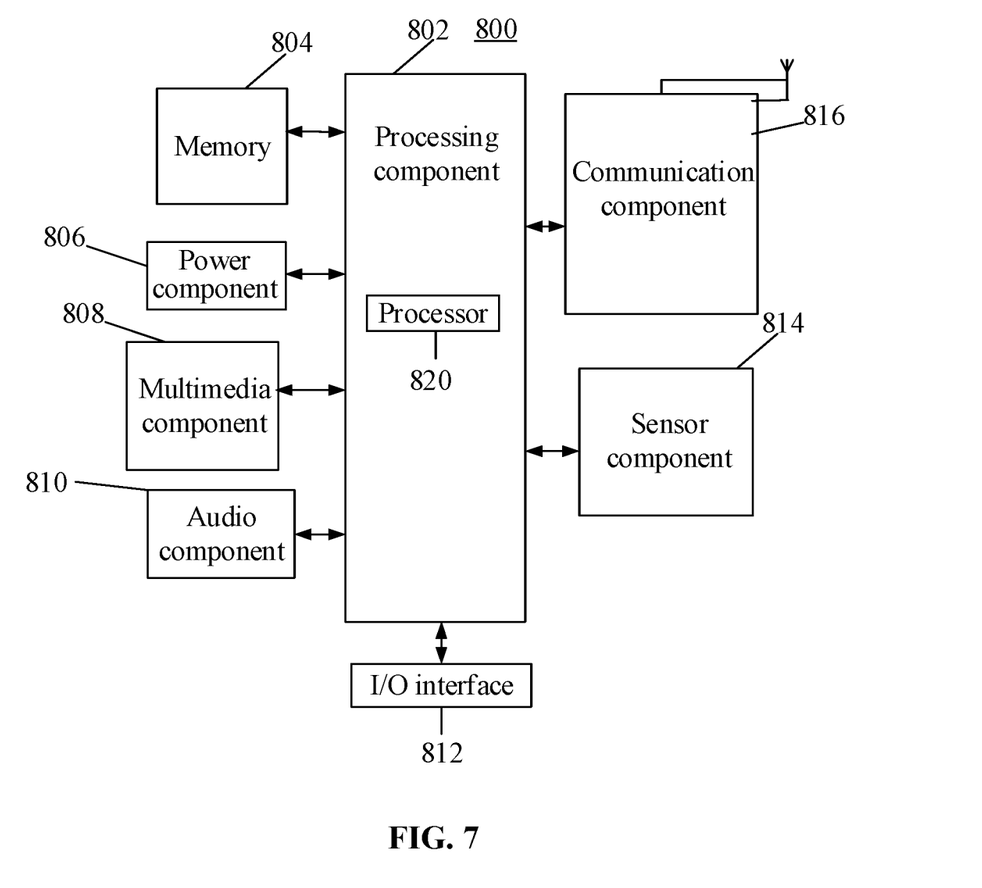
FIG. 7 illustrates a block diagram of a terminal according to some embodiments of the present disclosure.

FIG. 7 illustrates a block diagram of a terminal 800 according to some embodiments of the present disclosure. For example, the device 800 may be a mobile phone, a mobile computer and the like.

Referring to FIG. 7, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more portions which facilitate interaction between the processing component 802 and other components. For instance, the processing component 802 may include a multimedia portion to facilitate interaction between the multimedia component 808 and the processing component 802.

The memory 804 is configured to store various types of data to support the operation of the device 800. Examples of such data include instructions for any application or method operated in the device 800, contact data, phonebook data, messages, pictures, video, etc. The memory 804 may be implemented by any type of volatile or non-volatile memory devices, or a combination thereof, such as a an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). In some embodiments, organic light-emitting diode (OLED) or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface portion, and the peripheral interface portion may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a wireless fidelity (Wi-Fi) network, a $2^{nd}$-Generation (2G), $3^{rd}$-Generation (3G), $4^{th}$-Generation (4G), or $5^{th}$-Generation (5G) network or a combination thereof. In some embodiments of the present disclosure, the communication component 816 receives a broadcast signal or broadcast associated information from an external broadcast management system through a broadcast channel. In some embodiments of the present disclosure, the communication component 816 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 804 including an instruction, and the instruction may be executed by the processor 820 of the device 800 to implement the abovementioned method. For example, the non-transitory computer-readable storage medium may be a ROM, a Compact Disc Read-Only Memory (CD-ROM), a magnetic tape, a floppy disc, an optical data storage device and the like.

A non-transitory computer-readable storage medium has stored therein instructions that, when executed by a processor of a terminal, cause the terminal to execute a control method, the method including that:

a voice is acquired to obtain a voice signal;

image information is obtained;

whether a pose attribute of a target object that utters the voice satisfies a preset condition is determined based on the image information; and responsive to that the pose attribute of the target object satisfies the preset condition, an operation indicated by the voice signal is performed.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for voice control, comprising:
   acquiring a voice uttered by a target object, to obtain a voice signal;
   obtaining image information of the target object, wherein the image information comprises a pose attribute of the target object, the pose attribute of the target object comprising a face orientation of the target object;
   determining, based on the image information, whether the face orientation of the target object satisfies a preset orientation condition;
   respective to determining that the face orientation of the target object satisfies the preset orientation condition, determining a difference between a duration during which the face orientation of the target object satisfies the preset orientation condition and a duration during which the voice signal is acquired; and performing an operation indicated by the voice signal when the difference between the duration during which the face orientation of the target object satisfies the preset orientation condition and the duration during which the voice signal is acquired is less than a threshold.

2. The method of claim 1, wherein determining whether the face orientation satisfies the preset condition comprises:
responsive to that a face of the target object faces toward a voice device that acquires the voice signal, determining that the face orientation satisfies the preset orientation condition,
or,
responsive to that the face of the target object faces toward an execution device for performing the operation indicated by the voice signal, determining that the face orientation satisfies the preset orientation condition.

3. The method of claim 1, wherein performing the operation indicated by the voice signal comprises:
when the difference between the duration during which the face orientation of the target object satisfies the preset orientation condition and the duration during which the voice signal is acquired is less then the threshold, controlling the voice device to enter into a wakeup state from a dormant state; and adopting a voice service of the voice device in the wakeup state to perform or instruct an execution device corresponding to the operation indicated by the voice signal to perform the operation indicated by the voice signal.

4. The method of claim 3, further comprising:
when the difference between the duration during which the face orientation of the target object satisfies the preset orientation condition and the duration during which the voice signal is acquired is not less than the threshold, keeping the voice service in the dormant state.

5. The method of claim 1, wherein the pose attribute further comprises at least one of: a facial expression, an eye focus state, or a gesture.

6. A mobile phone implementing the method of claim 1, wherein the mobile phone is configured to perform the operation indicated by the voice signal without a wakeup word.

7. A terminal, comprising:
a processor; and
a memory configured to store instructions executable for the processor,
wherein the processor is configured to:
acquire a voice uttered by a target object, to obtain a voice signal;
obtain image information of the target object, wherein the image information comprises a pose attribute of the target object, the pose attribute of the target object comprising a face orientation of the target object;
determine, based on the image information, whether the face orientation of the target object satisfies a preset orientation condition;
respective to determining that the face orientation of the target object satisfies the preset orientation condition, determine a difference between a duration during which the face orientation of the target object satisfies the preset orientation condition and a duration during which the voice signal is acquired; and
perform an operation indicated by the voice signal when the difference between the duration during which the face orientation of the target object satisfies the preset orientation condition and the duration during which the voice signal is acquired is less than a threshold.

8. The terminal of claim 7, wherein the processor is further configured to:
responsive to that a face of the target object faces toward a voice device that acquires the voice signal, determine that the face orientation satisfies the preset orientation condition,
or,
responsive to that the face of the target object faces toward an execution device for performing the operation indicated by the voice signal, determine that the face orientation satisfies the preset orientation condition.

9. The terminal of claim 7, wherein the processor is further configured to:
when the difference between the duration during which the face orientation of the target object satisfies the preset orientation condition and the duration during which the voice signal is acquired is less than the threshold, control the voice device to enter into a wakeup state from a dormant state and adopt a voice service of the voice device in the wakeup state to perform or instruct an execution device corresponding to the operation indicated by the voice signal to perform the operation indicated by the voice signal.

10. The terminal of claim 9, wherein the processor is further configured to:
when the difference between the duration during which the face orientation of the target object satisfies the preset orientation condition and the duration during which the voice signal is acquired is not less than the threshold, keep the voice service in the dormant state.

11. A non-transitory computer-readable storage medium having stored therein instructions that, when executed by a processor of a terminal, cause the terminal to perform a method for voice control, the method comprising:
acquiring a voice uttered by a target object, to obtain a voice signal;
obtaining image information of the target object, wherein the image information comprises a pose attribute of the target object, the pose attribute of the target object comprising a face orientation of the target object;
determining, based on the image information, whether the face orientation of the target object satisfies a preset orientation condition;
respective to determining that the face orientation of the target object satisfies the preset orientation condition, determining a difference between a duration during which the face orientation of the target object satisfies the preset orientation condition and a duration during which the voice signal is acquired, and
performing an operation indicated by the voice signal when the difference between the duration during which the face orientation of the target object satisfies the preset orientation condition and the duration during which the voice signal is acquired is less than a threshold.

12. The non-transitory computer-readable storage medium of claim 11, wherein determining whether the face orientation satisfies the preset condition comprises:
responsive to that a face of the target object faces toward a voice device that acquires the voice signal, determining that the face orientation satisfies the preset orientation condition,
or, responsive to that the face of the target object faces toward an execution device for performing the operation indicated by the voice signal, determining that the face orientation satisfies the preset orientation condition.

13. The non-transitory computer-readable storage medium of claim 11, wherein performing the operation indicated by the voice signal comprises:

when the difference between the duration during which the face orientation of the target object satisfies the preset orientation condition and the duration during which the voice signal is acquired is less than the threshold, controlling the voice device to enter into a wakeup state from a dormant state; and adopting a voice service of the voice device in the wakeup state to perform or instruct an execution device corresponding to the operation indicated by the voice signal to perform the operation indicated by the voice signal.

14. The non-transitory computer-readable storage medium of claim 13, wherein when the difference between the duration during which the face orientation of the target object satisfies the preset orientation condition and the duration during which the voice signal is acquired is not less than the threshold, keeping the voice service in the dormant state.

* * * * *